United States Patent [19]

King et al.

[11] Patent Number: 4,954,383

[45] Date of Patent: Sep. 4, 1990

[54] PERFORATED GLUE THROUGH FILMS

[75] Inventors: Robert N. King, Sunnyvale; Gerald R. Behling, Santa Clara, both of Calif.

[73] Assignee: Southwall Technologies, Inc., Palo Alto, Calif.

[21] Appl. No.: 225,743

[22] Filed: Jul. 29, 1988

[51] Int. Cl.$^5$ .............................................. B32B 3/00
[52] U.S. Cl. .................................... 428/131; 428/132; 428/134; 428/136; 428/137; 428/209; 428/212; 428/215; 428/216; 428/192; 428/198; 428/220; 428/336; 428/337; 428/409; 428/412; 428/418; 428/419; 428/458; 428/463; 156/250; 156/251; 156/252; 156/253
[58] Field of Search ............... 428/131, 132, 134, 136, 428/137, 209, 212, 215, 216, 220, 198, 192, 336, 337, 409, 412, 418, 419, 458, 463; 156/250, 251, 252, 253

[56] References Cited

U.S. PATENT DOCUMENTS 4,099,765  7/1978  Bright ................................. 428/136

FOREIGN PATENT DOCUMENTS 1355036  5/1974  United Kingdom .

Primary Examiner—Patrick Ryan
Attorney, Agent, or Firm—Irell & Manella

[57] ABSTRACT

Metallized plastic sheet film products improved by being perforated through their surfaces are disclosed. These sheet products can be incorporated into improved strength composites since their perforations permit glue through and prevent delamination and shear previously observed with metallized plastic sheet film products. In addition, the perforations can be used to adjust the conductivity/resistance of the electrically conductive sheet films.

14 Claims, 1 Drawing Sheet

PERFORATED GLUE THROUGH FILMS

BACKGROUND OF THE INVENTION

1. Field of the Invention

This invention relates to metallized plastic film products and their use in composite structures. In a preferred embodiment, this invention relates to electrically conductive films and their use in shaped composite structures.

2. Description of Prior Art

It has long been recognized that metallic layers can be deposited on plastic films. Chemical vapor deposition techniques, plating processes, magnetron sputtering and ion sputtering are representative processes for depositing nanometer thick (or thicker) films of metals, metal compounds, and the like on plastic materials such as plastic sheets. A typical product produced heretofore is a plastic body or a plastic film having a metal layer on one or both sides. The usual film product is a continuous sheet product. These sheet products find applications in electronic devices, in windows as light reflectors, and in other applications where a thin sheet of metal is useful.

In these and many other applications, it may be desired to incorporate the metallized plastic sheet material into laminated composite structures. In these structures, the metallized sheet can provide an electrically conductive surface or impart other useful metal properties to the composite. While conventional metallized plastic sheet products have been used in these applications, they have two inherent characteristics which interfere with their acceptability in high performance areas.

The first of these two problems is that the metallized plastic layers, being continuous plastic sheets, have difficulty conforming to complex or compound curves. This can be solved in some cases by tailoring the sheet to fit the object to which it is being laminated or by folding the sheet to conform. So too, a stretchable continuous substrate can also give some degree of conformance to the complex compound curves. However, these solutions are far from ideal. The cutting and folding approaches can be extremely labor intensive. They also can introduce or give rise to breaks in the film's metal coating which can degrade or destroy desired electrical properties. The use of stretchable substrates presents the problem that the metal coating often is less able to stretch than the substrate and thus breaks or separates from the substrate.

The second problem relates to the strength of the adhesion between either the metal layer and the substrate, the composite resin and the metal layer, or the composite resin and the plastic substrate. Often, the grip between these surfaces is relatively poor. This can be a significant problem when the material is incorporated into laminates because the boundary between the plastic sheet or the metal coated on the sheet and the surrounding composite resin can serve as shear planes which can disrupt or defeat the strength of the overall laminate structure.

One way to address this second problem would be to improve the adhesion of the metal layer to the substrate. Drauglis et al, in USP 4,374,717, issued in 1983, suggest that the adhesion of sputtered chromium to urethane substrates can be improved by applying a coating of plasma polymerized acetonitrile under and over the metal layer. Manabe, et al, in USP 4,369,225, issued in 1983, suggest that an improved metal coating is achieved when the metal is undercoated with a flexible urethane paint and then overcoated with a similar material. Gliem, et al, suggest in USP 4,364,792, issued in 1982, that the adhesion of metals can be improved by etching the surface of the polymer to roughen it prior to coating. Kumagai, et al, show another approach in USP 4,402,998, issued in 1983, when they suggest that a primer coat of metal be laid down, followed by a catalyst layer and finally the desired metal layer. All of these representative disclosures point up the problem with adhesion. Their solutions may work in certain low performance areas, such as decorative coatings and sheltered electronic devices, but they do not suggest that their solutions are adequate in high performance areas where the shear plane can severely detract from the strength of ultrahigh strength composite materials as are found in aircraft and the like.

When we produced metallized thin films for incorporation into such high performance composite structures, the above-described failings appeared. It is, therefore, an object of this invention to solve these problems presented by prior metallized plastic films.

STATEMENT OF THE INVENTION

A simple but dramatically effective discovery has now been made. It has now been found that a structural sheet product comprising a plastic sheet and having deposited on one or both of its sides a coating comprising an electrically conductive metal layer is improved for use in composites and the like by applying a plurality of perforations through the plastic sheet and the coating. It has been found that these perforations do not adversely effect the bulk electrical properties of the conductive metal layer and permit several advantages to be achieved. For one, ultrahigh strength composite materials can be formed from these sheets and composite-forming resins since the resins can "glue through" the perforations and prevent the metallized sheet from serving as a shear plane. For another, the perforations add significant drape or formability to the plastic sheets so that they can be formed into compound curves and the like. For another, the perforations can be applied in a controlled manner as needed to adjust the sheet resistivity of the product or to give a variable sheet resistivity from point to point on the sheet.

In accord with the present invention the perforations can take the form of slits, so as to give a "lettuce wrap" type product or they can take the form of holes punched through the plastic/metal sheet product. In a presently preferred embodiment, the electrically conductive metal layer is a sputter-deposited layer especially one having a thickness of from about 5 nm to about 500 nm. In another aspect, this invention provides composite structures incorporating the perforated sheet film. In yet another aspect this invention provides a method of forming the perforated sheet films in which the plastic substrate is coated with the conductive metal layer and thereafter subjected to perforation such as by slitting or by punching.

DESCRIPTION OF PREFERRED EMBODIMENTS

Brief Description of the Drawings

This invention will be described with reference being made to the accompanying drawings in which.

Detailed Description of the Invention

Figure 1:
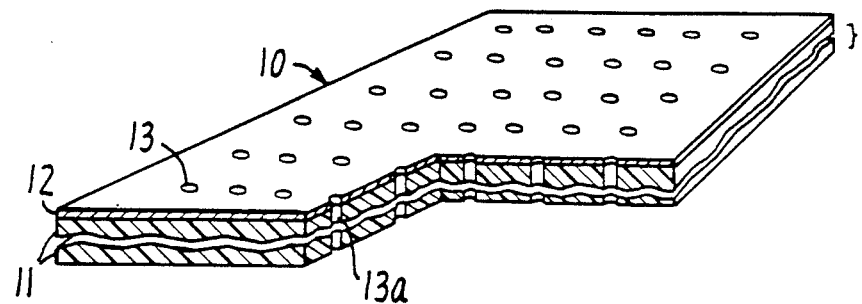
FIG. 1 is a not-to-scale cut-away perspective view of a plastic sheet product in accord with this invention.

The product of this invention is a plastic sheet or film having an electrically conductive layer on one or both surfaces and containing perforations through the conductive layer and the plastic sheet. A simple embodiment of this product is shown in FIG. 1 as sheet 10. Sheet 10 includes a plastic substrate 11 having deposited on its surface a conductive metal layer 12 and having a plurality of perforations 13 and 13A. As can be seen with reference to perforation 13A, the perforations extend through the metal layer and the plastic substrate. In this figure, plastic sheet 11 is shown in discontinuous section. This is done to illustrate the fact that the plastic substrate is many times thicker than the metal layer 12. Typically, the substrate is on the order of several mils in thickness and the metal layer is on the order of nanometers in thickness.

Figure 2:
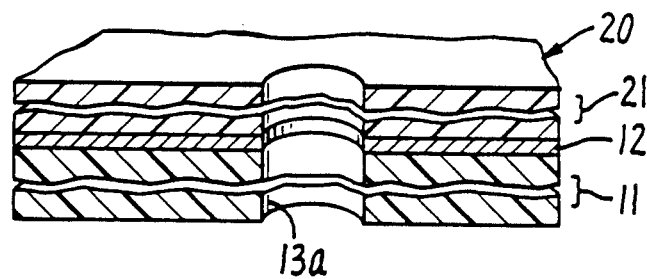
FIG. 2 is an expanded view, also not to scale, showing a cut-away of a preferred embodiment of the plastic sheet product of this invention.

As shown in FIG. 2, the sheet products of this invention may contain additional layers, as well. In sheet product 20, as shown in FIG. 2, an additional layer is present. This layer, 21, is an adherent protective liner film. This layer is provided as physical protection for the very thin metallic film. It assures the integrity of the metal layer and prevents it from becoming scratched during handling and the like. It is removed prior to composite fabrication. As will be set forth hereafter, the products of this invention can contain a variety of other optional layers, if desired.

Figure 3:
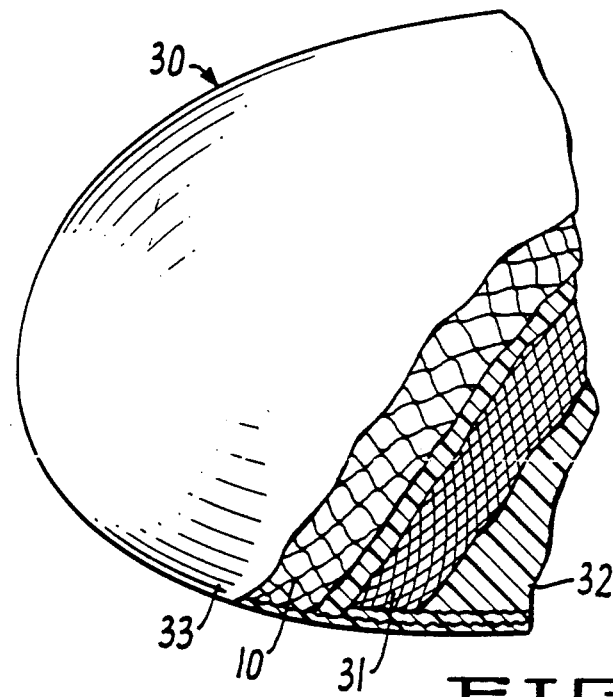
FIG. 3 is a partially cut-away perspective view of a compound curve composite product illustrating one application of the plastic sheet products of this invention.

FIG. 3. shows a compound curved housing 30 which employs the metallized plastic layer 10 of this invention in its construction. Housing 30 includes filament winding 31 and a casting resin 32/33. The resin shown as 32 and 33 impregnates the filament winding and glues through the layer 10 so as to give a continuous body of resin. This assures the strength of the product and prevents delamination at the metallized or plastic sheet surfaces.

The Plastic Film

The plastic film employed in the metallized sheets of this invention is an essentially two dimensional sheet. Included within the definition of films and sheets as used herein are fabric-like materials and "paper"-like materials. Typical films are from about 0.25 to about 20 mil thick. Thicker or thinner materials may be used, if desired. Preferably the film is from about 0.5 mils to about 5 mils thick and is a plastic roll stock. It will be appreciated that the primary function of the film is to provide a substrate for the metal layer it carries. Therefore, it is not always necessary to use a film that has special properties or characteristics.

The exact nature of the film can be set, in part, by the nature of the metal deposition employed. It is important to select a film that is compatible with the metallizing method. For example, if a chemical deposition method is used, the film should be compatible with the deposition chemistry and environment. Similarly, if a vacuum deposition method such as sputtering or ion deposition is used, the substrate film should be able to withstand the deposition temperatures and be able to be used without substantial outgassing or the like at the high vacuum conditions employed. Similarly, the substrate should not detract from the properties of the overall composite in its environment of use. For example, if the composite is to be placed in a thermally hostile environment, the substrate should be such as to withstand it.

Typical plastics include the polyesters and in particular the polyethylene terphthalates marketed under trademarks such as Mylar, Melinex, Hostaphan and the like; another group of representative substrates are the polyimides marketed under trademarks such as Kapton, Upilex, Novax, and Apical. Other forms of polyimide such as Nomex "paper" sheets can be employed as well. Some of these materials such as polyimides, polysulfones, and polyetherimides are suitable materials if high temperature stability is an issue as they are known to have good thermal performance properties.

In addition to the above polymers, any polymer which is capable of withstanding the conditions of metallizing can be used, these include polyacrylics, polycarbonates, polyamides and polyetherimides. In general these systems will withstand the conditions of the preferred metal deposition method which is vacuum sputtering. This process will often reach temperatures of 150° C., etc. The polyimides, such as the Kapton material are very suitable and in our experience preferred.

The Metal Layers

The metal layers carried on the plastic sheets are thin films. These layers are referred to as "metal" layers for simplicity but can include within this term mixtures of metals, metal compounds and mixtures of metals and metal compounds. The films typically have a thickness of from about 5 nm to about 2,000 nm and preferably from about 5 nm to about 1,000 nm. If desired, multi-layered metal structures can be laid down such as layers of different metals or combination of metals and dielectrics.

The reasons for incorporating the metal layers into the final composites are often electrical in nature, such as to impart a given conductivity to a structure, to impart impedance matching properties to a structure, or the like. Accordingly, it is often desired to define the "metal" layers in terms of their electrical properties, in particular their sheet resistivities. Typical sheet resistivities can range from less than 1 ohm per square to about 2000 ohms per square. Preferred sheet resistivities range from about 10 ohms per square to about 1500 ohms per square.

Typical materials for incorporation in to the products as the metal layer include the conductive metals such as copper, gold, silver, aluminum, nickel, platinum, palladium, chromium or the like. In addition, mixed metals (alloys) can be laid down, for example, nickel/ chromium alloys, stainless steel alloys, brass, and the like. Representative metal compounds include various metal oxides, suboxides, silicides, nitrides and the like.

The metal layer can be applied to one or both sides of the plastic substrate. This points up one major advantage of the present invention that the general configuration of the metal-coated plastic substrate can be varied widely without adversely impacting the properties of the final product as a direct result of the perforations called for herein.

Additional Layers

In addition to the plastic substrate and the metal layers, one can add protective overlayers or adhesion promoting layers or the like. For example, a plurality of metal layers can be used, separated, if desired, from one another by intervening layers, such as layers of dielectric or the like. These additional layers can be in the form of a sputter-deposited or the like thin layers or they can be in the form of one or more thick "macrolayers" (that is, a layer similar in thickness to the plastic substrate) such as a protective or adhesive polymer layer or tackifier applied over the metal layer.

Conventional materials of the art may be used for these additional layers. For example, if a dielectric layer is desired, it can be selected from materials having a bulk resistivity of greater than 5 ohm centimeters such as silicon, silicon oxide, silicon oxide/titanium oxide, alumina, titanium oxide, silicon/germanium oxide, indium/ tin oxide and the like. These dielectric layers can be laid down by various thin layer deposition methods such as sputter depositing.

When macrolayer layers are added this can be done by various lamination, printing, or spray methods. Typical macrolayers include protective hardcoats such as epoxy or siloxane hardcoats, adhesion promoters and primers such as silane primers, and plastic over coats such as urethanes, epoxies, and the like.

The Perforations

A key to the present invention is the presence of perforations through the metallized plastic sheet. These perforations can take the form of slits so as to give a "lettuce wrap" type product or they can take the form of holes punched through the film. If holes are used, they can take up as much as 75% or even 90% of the surface area of this sheet, if desired. The size of the holes can be controlled, and are end use application specific. In a preferred embodiment, the largest dimension of the holes should not exceed about 1 millimeter. At the lower end, hole size is controlled by the hole punching process. Typically, holes are larger than about 0.1 millimeters. This lower number should not be considered a strict limit however, as other equivalent sizes can be used as well. In many applications, there seems to be equivalent performance with holes this small and holes as large as about 1 mm. In view of the relative ease of punching the larger holes, they are generally preferred, unless their size compromises end use performance.

In the case of the "lettuce wrap" products the slits should be no longer than about a centimeter or two. In addition, they should be spaced no more than about a centimeter apart. Preferably, they are from about 0.5 mm long to about 2 mm long and spaced about 0.5 to about 1 mm apart.

The perforations of this invention can serve a number of useful purposes, each of which can lead to highly advantageous properties and products. For one, the perforations provide "glue through" opportunities so that the plastic film does not serve as a shear plane in a high strength composite. In this application, the resin employed is generally a conventional composite forming resin such as an epoxy resin, a urethane resin or a polyimide resin such as the high temperature bismaleimidetype resins known in the art. For another advantage, the perforations serve to increase the drape and conformability of the film. This permits the film to be more easily conformed into complex and/or complicated shapes.

The perforating of the film also provides an additional and unrelated advantage which finds application in a wide range of applications not encompassed by composite-forming. This advantage is that it increases the sheet resistance of the film. In other words, resistivity (resistance) can be increased proportional to the degree of perforation. In this case, hole punching may be preferable to slitting as it allows the actual removal of metal layer from the sheet product. The increase in resistance can be used to adjust the resistance of the film very precisely. It can also be used to increase resistances by as much as a factor of 3 to 5 or so. It can also be used to give a variable resistance across or along a sheet of metallized film.

This ability to control resistance accurately or to increase resistance by up to four or even tenfold by punching holes and this ability to give variable resistance on a given sheet of film can give unique electrical properties to a product incorporating the film.

Preparation Methods

The films of this invention are generally made in a two-step process. In the first step, the conductive metal layer is laid down on a continuous nonperforated sheet of film. In the second step, the film is perforated either by slitting or by punching. Any conventional perforating system which will give rise to perforations of this size and density described, above can in theory be used.

The method for depositing the metal layer can be selected from any of the physical or chemical methods known in the art for depositing metal layers on plastic sheets. These include chemical vapor deposition, ion beam sputtering, magnetron sputtering and the like. Due to our expertise in the field, we prefer to use magnetron sputtering. The metal layer can be laid down with a uniform resistivity or a tapered resistivity prior to perforation, as is well practiced by those in the deposition art.

The addition of other optional layers can take place before or after the perforating depending upon the economies of the process.

EXAMPLE

The invention will be further described with reference to the following example. This example is provided merely to illustrate the invention and is not to be construed as a limitation on the invention's scope.

A roll of polyimide sheet film 2 mil thick (Kapton) is placed in a continuous-feed magnetron sputtering unit. The sputtering unit is equipped with a plurality of nickel/chromium electrodes. After evacuation, the polyimide roll stock is fed past the electrodes which are operated in a magnetron sputtering mode so as to continuously deposit a coherent essentially uniform layer of nickel/chromium on the Kapton film. The sheet resistivity of the product is measured during lay down and by controlling the electrode conditions and the line speed of the substrate past the electrodes, an average sheet resistance of about 100 ohms/square is achieved. The product is then removed from the magnetron sputterer and laminated with a 1 or 2 mil thick release liner. One section of this film is then placed in a perforating device and cut into a lettuce wrap configuration with slits approximately 5 millimeters long and 2 millimeters apart. Other portions are subjected to perforation by hole punching. The number of holes is varied. In some cases a uniform density of holes is applied. In other cases the arrangement of holes is varied from place to place on the sheet of film. Hole size is varied between about 0.1 and about 5 millimeters with best results being observed when the hole size is held at 1 millimeter diameter or smaller. The density of holes ranges from about 1% up to about 90% of the total area of the film. The sheet resistivity of the film is measured before and after hole punching. It is seen that the sheet resistance of the film goes up as holes are punched in it. At the highest levels of punching the resistance is increased by as much as fourfold to fivefold compared to the starting film.

The preparation process just described is repeated using other metal layers. Initial films having sheet resistances of for example 100 ohm/square can be increased in sheet resistance to as much as 500, 600 or even 1,000 ohm/square. This is accomplished by the punching while still having metal layers thick enough to have good physical integrity.

The products of the examples are examined and used in a number of configurations. In the examination, it is seen that the electrical properties of this sheet mimic the properties of this sheet without perforations, but with the sheet resistivity increasing as a function of the amount of film removed by perforation.

The sheet products are incorporated into laminated structures. It is seen that both the slit and the punched products have improved drape and are more easily conformed to complex compound curves with minimal wrinkling or puckering. When used in combination with casting resins, these materials provide excellent glue-through and thus excellent strength to the composite. When composites made using the perforated materials are compared with composites made with the same materials in unperforated form, it is seen that substantial strength advantages are achieved by using the perforated materials.

We claim:

1. In a plastic sheet product comprising a 0.25 to 20 mil thick metallizable plastic sheet substrate having deposited on one or both of its sides a coating comprising an electrically conductive metal layer, said metal layer being from 5 nm to 500 nm in thickness, the improvement comprising a plurality of perforations through said plastic sheet and said coating, said perforations being selected from a plurality of slits, said slits being not greater than 2 cm in length and spaced not more than 1 cm from one another and from a plurality of holes said holes being of a size and density such that the holes constitute from about 1% to about 90% of the surface area of said plastic sheet.

2. The plastic sheet product of claim 1 wherein said perforations are slits.

3. The plastic sheet product of claim 1 wherein said perforation are holes.

4. The plastic sheet product of claim 1 wherein the electrically conductive metal layer is sputter-deposited.

5. The plastic sheet product of claim 1 wherein said plastic substrate comprises a plastic selected from the group consisting of polyester, polyimide, polysulfone, polyamide, polyacrylic, polycarbonate, and polyetherimide.

6. A composite structure comprising the plastic sheet product of claim 1 embedded in a cured polymer resin matrix with said matrix being continuous through the perforations in said plastic sheet product.

7. The composite structure of claim 6 wherein said metal layer is a sputter-deposited metal layer.

8. The composite structure of claim 6 wherein said plastic substrate comprises a plastic selected from the group consisting of polyester, polyimide, polysulfone, polyacrylic, polycarbonate, polyetherimide, and polyamide.

9. The composite structure of claim 8 wherein said perforations are holes.

10. The composite structure of claim 8 wherein said perforations are slits.

11. The composite structure of claim 6 wherein said cured polymer matrix is a cured epoxy matrix.

12. The composite structure of claim 6 wherein said cured polymer matrix is a cured imide matrix.

13. A structural composite material comprising reinforcing fibers and a plastic sheet product of claim 1 embedded in a cured polymer matrix, said matrix being continuous through the perforations in said plastic sheet product.

14. A method for upwardly adjusting sheet resistance of a 0.25 to 20 mil thick plastic sheet product including a metallizable plastic substrate having deposited on one or both of its sides a coating comprising an electrically conductive sputter-deposited metal layer said metal layer being from 5 nm to 500 nm in thickness, the method comprising making a controlled plurality of perforations through said plastic substrate and said coating in these regions of the product in which it is desired to upwardly adjust the sheet resistance, said perforations being selected from a plurality of slits, said slits being not greater than 2 cm in length and spaced not more than 1 cm from one another and from a plurality of holes said holes being of a size and density such that the holes constitute from about 1% to about 90% of the surface area of said plastic sheet.

* * * * *